E. A. BACKUS.
WATERING TROUGH.
APPLICATION FILED JAN. 29, 1913.

1,065,767.

Patented June 24, 1913.

2 SHEETS—SHEET 1.

Witnesses

Inventor
E. A. Backus

By Victor J. Evans.
Attorney

E. A. BACKUS.
WATERING TROUGH.
APPLICATION FILED JAN. 29, 1913.

1,065,767.

Patented June 24, 1913.

2 SHEETS—SHEET 2.

Witnesses
Wm. H. Mulligan.
D. W. Gaud.

Inventor
E. A. Backus.

By Victor J. Evans.

Attorney

UNITED STATES PATENT OFFICE.

EDWARD A. BACKUS, OF LITTLE ROCK, ARKANSAS.

WATERING-TROUGH.

1,065,767.   Specification of Letters Patent.   Patented June 24, 1913.

Application filed January 29, 1913. Serial No. 744,951.

*To all whom it may concern:*

Be it known that I, EDWARD A. BACKUS, a citizen of the United States, residing at Little Rock, in the county of Pulaski and State of Arkansas, have invented new and useful Improvements in Watering-Troughs, of which the following is a specification.

The invention relates to an improvement in watering troughs and particularly to an automatic structure in which the weight of the animal when in position to drink from the water receptacle will automatically open the valve for the discharge of the water into the receptacle, the construction of the parts providing for the automatic cutting off of the water supply upon the animal leaving the drinking position and simultaneously discharging the contents of the receptacle, whereby to wholly free the latter from contained water.

The invention in its preferred form of details will be described in the following specification, reference being had particularly to the accompanying drawings, in which:—

Figure 1:
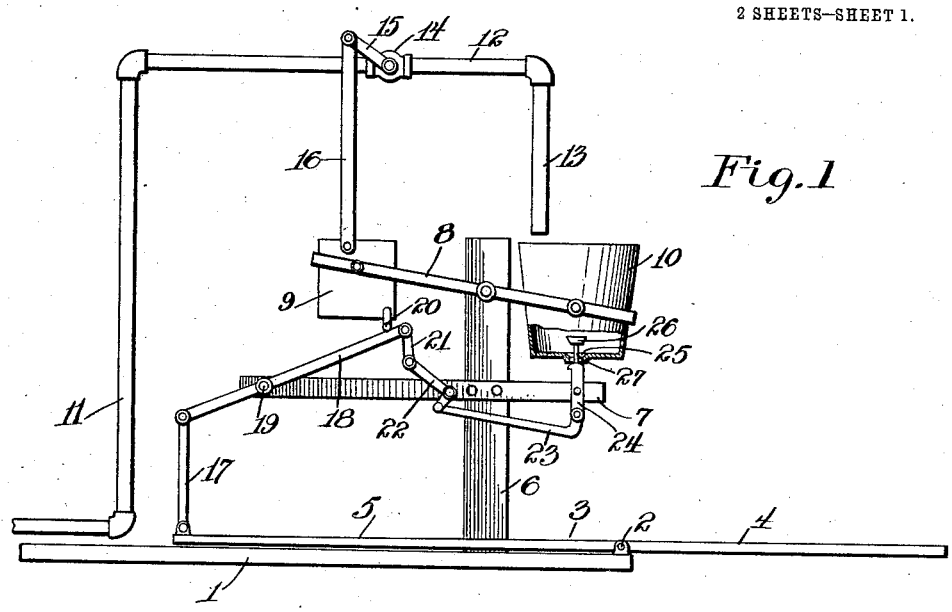
Figure 3:
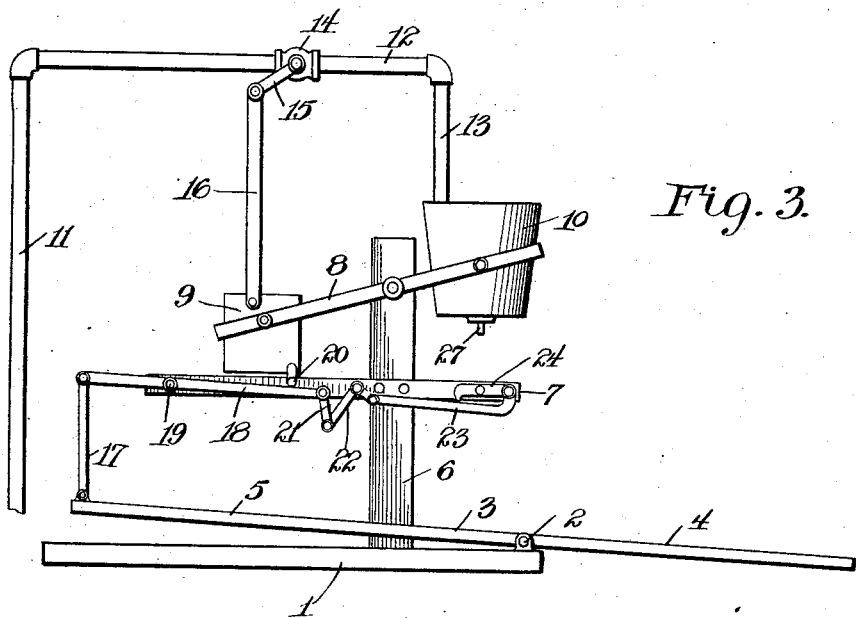
Figure 2:
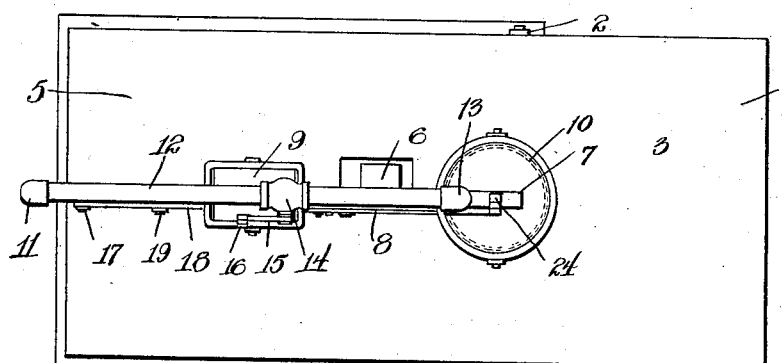
Figure 5:
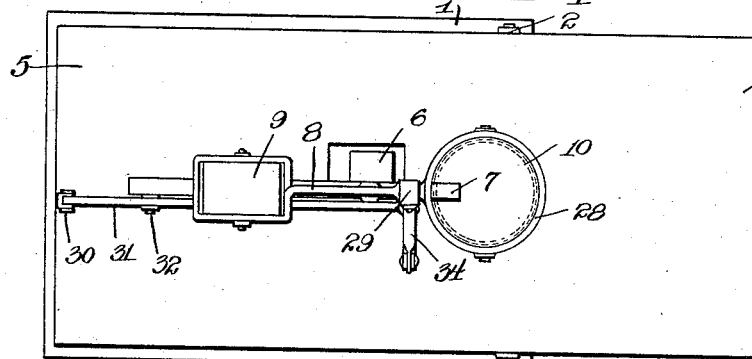
Figure 4:
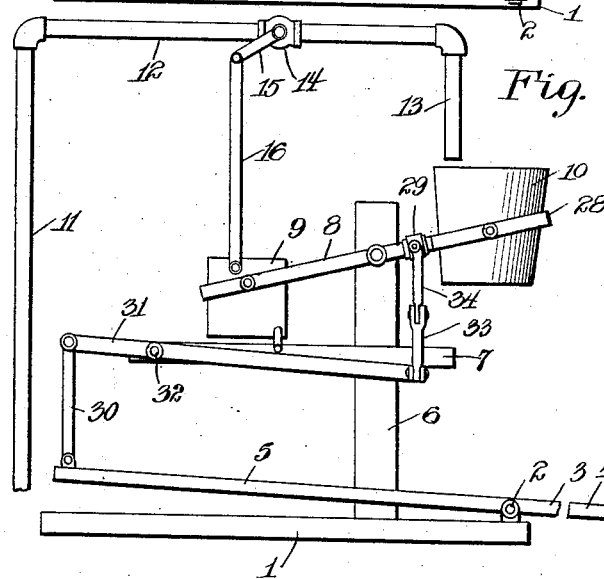
Figure 6:
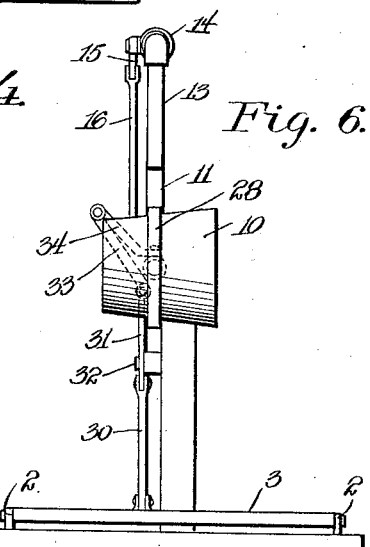

Figure 1 is a view in side elevation of the preferred type of device. Fig. 2 is a plan with the water receptacle shown in dotted outline. Fig. 3 is a view similar to Fig. 1 with the parts in operative position. Fig. 4 is a side elevation of a modified form of the device. Fig. 5 is a plan with the water receptacle in dotted outline and the supply pipe removed. Fig. 6 is an end elevation with the water receptacle in discharging position.

Referring particularly to the accompanying drawings and more especially to Figs. 1, 2 and 3 thereof the improved watering trough comprises a base 1 upon which is pivotally supported at 2 a platform 3. The pivot is so arranged that the forward portion 4 on which the animal is supposed to stand when drinking is of materially less length than the rear portion 5, the weight being such that the rear portion will sufficiently overbalance the forward portion and when the latter is relieved of the weight of the animal to cause the rear portion to operate the structure. Rising from the base 1 is a standard 6 on which some distance above the base is secured a cross bar 7. Pivotally mounted on the standard above the cross bar 7 is a lever 8 to one end of which is secured a weight 9 and to the opposite end is secured a drinking receptacle 10 preferably in the form of a bucket. A water pipe 11 leads from any suitable source of supply having a horizontal portion 12 disposed above the standard and a depending or discharge spout 13 opening above the bucket 10. A valve 14 is arranged in the horizontal portion 12 of the pipe, being connected through the medium of a link 15 with a rod 16 which in turn is connected to the weight 9. In this connection it will be understood that the weight 9 is sufficient to overbalance the weight of the empty bucket 10 and that when said bucket is filled then the weight thereof will overbalance the weight 9. To the end cover of the platform 3 is secured an upright 17 connected at its upper end to the lever 18 pivoted at 19 to the cross bar 7, the long end of the lever being beyond the pivot with respect to the upright 17. The weight 9 is provided with lateral projection 20 arranged above and in the path of movement of the long end of the lever 18, and the free terminal of the long end of the lever 18 is connected by a link 21 to one end of the angle lever 22 which angle lever is pivotally secured to the cross bar 7 and has its opposite end connected to the rod 23, the forward end of which underlies the bucket and is connected at one end of the valve operating bar 24. The bucket 10 is formed in its base with an opening 25 normally closed by gravity operating valve 26, said valve having a stem 27 depending below the bottom of the bucket. The operation of this form of device is as follows: Under normal conditions the long end of the platform being lowered the forward or long end of the lever 18 is elevated, engaging the projection 20 of the weight to hold the said weight elevated to maintain the valve 14 in closed position. As the animal steps upon the short end 4 of the platform and depresses same the long end thereof is elevated forcing the short end of the lever 18 upward. This movement relieves the weight of the pressure of said lever and allows said weight to move downward and open the valve 14. In this movement of the lever 18 the angle lever 22 is rocked so as to move the valve operating bar 24 forwardly out of the path of the valve stem 26. Water now flows into the bucket and as the bucket is filled it will gradually overbalance weight 9 and operate to close the valve. When the animal satisfies his thirst and leaves the platform the parts return to normal position, the lever 18 moving up to raise the weight if necessary to close the valve and at the same time said lever operates through the medium of the angle lever 22 to move the valve operating bar 24 in the path of the stem 27. The valve 25 is now open and the entire contents of the bucket discharged.

In Figs. 4, 5 and 6 I have shown a slightly modified form wherein the platform, standard, cross bar, weight, valve and connection with the weight, bucket, supply pipe, and lever connecting the bucket and weight are similar to that previously described, except that in this instance the bucket 10 is mounted upon a frame 28 which is pivotally connected for rotary movement at 29 to the remaining section of the lever 8. The long end of the platform 3 is provided with upright 30 connected to the short end of the lever 31 pivoted at 32 to the cross bar 7. The long end of the lever coöperates with the weight projection 20 as in the preferred form, and the terminal of the long end of this lever is provided with a bar 33 connected to the arm 34 projecting laterally from the frame 28.

In the operation of the modified form of the device the action of the parts under the influence of the animal's weight is identical to that previously described the difference being that when the animal leaves the platform to restore the parts to normal position the upward movement of the terminal of the long end of the lever will through the bar 34 and arm 35 swing or tilt the bucket and discharge its contents.

It is obvious from the above construction that as long as the animal remains on the platform the water will be discharged into the bucket until the weight of such water is sufficient to overcome the weight 9, and that all water remaining in the bucket when the animal leaves the platform will be automatically discharged therefrom.

What is claimed is:—

1. A watering trough including a supply pipe, a receptacle, a weight connected with the receptacle, water controlling means in the supply pipe, a connection between said means and the weight, a lever connecting the receptacle and weight and pivoted intermediate the same, an animal operated platform, means carried by the platform to actuate the weight upon the animal leaving the platform, said means operating to discharge the contents of the receptacle.

2. A watering trough including a supply pipe, a receptacle, a weight connected with the receptacle, water controlling means in the supply pipe, a connection between said means and the weight, a lever connecting the receptacle and weight and pivoted intermediate the same, an animal operated platform, means carried by the platform to actuate the weight upon the animal leaving the platform, and receptacle discharging means carried by the lever.

3. A watering trough including a pivoted platform, a lever pivotally supported above the platform, a supply pipe, a valve therefor, a weight carried by one end of the lever, a connection between said weight and valve, a receptacle carried by the opposite end of the lever, an upright carried by the platform, and a lever connected to the upright and operating to move the weight to valve closing position upon the relief of the platform from the animal's weight, a receptacle discharge means, the connection intermediate said lever and said discharge means to operate the same in the weight elevating movement of the lever.

In testimony whereof I affix my signature in presence of two witnesses.

EDWARD A. BACKUS.

Witnesses:
W. H. MARTIN,
J. F. HERD.

---

Copies of this patent may be obtained for five cents each, by addressing the "Commissioner of Patents, Washington, D. C."